United States Patent
Quiachon, Jr.

(10) Patent No.: US 6,704,276 B1
(45) Date of Patent: Mar. 9, 2004

(54) SELF-CONTAINED, MULTI-AXIS RECORDABLE AND STORAGE APPARATUS

(76) Inventor: Perfecto B. Quiachon, Jr., 160 Litchfield Ct., Vallejo, CA (US) 94589

( * ) Notice: Subject to any disclaimer, the term of this patent is extended or adjusted under 35 U.S.C. 154(b) by 0 days.

(21) Appl. No.: 10/217,639

(22) Filed: Aug. 13, 2002

(51) Int. Cl.[7] .............................. G11B 3/70; B65D 85/57
(52) U.S. Cl. ........................................ 369/291; 206/310
(58) Field of Search ....................... 369/291; 206/308.1, 206/310

(56) References Cited

U.S. PATENT DOCUMENTS 5,322,162 A * 6/1994 Melk ........................ 206/310
5,839,576 A * 11/1998 Kim ........................ 206/308.1

* cited by examiner

Primary Examiner—George J. Letscher
(74) Attorney, Agent, or Firm—Charles L. Thoeming

(57) ABSTRACT

A self-contained, multi-axis recordable and storage apparatus includes an external frame, a hinged component pivotally attached to the frame by a shaft or ball joint, and/or an internal component. The apparatus provides a self-contained, multi-axis recordable and storage apparatus which will universally adapt to all existing reading or writing devices. The apparatus will accept existing recorded medium, analog or digital, and allow the whole apparatus assembly with its protective cover and container to be inserted into playing, reading, or writing devices.

34 Claims, 17 Drawing Sheets

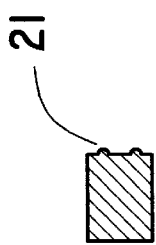
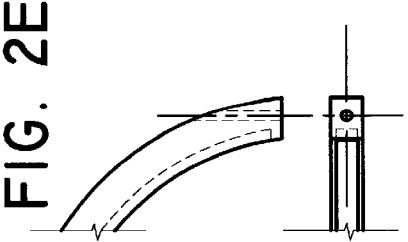
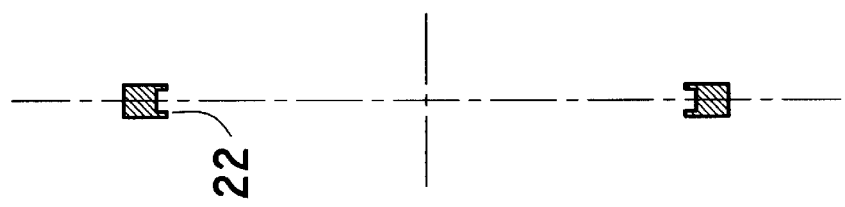
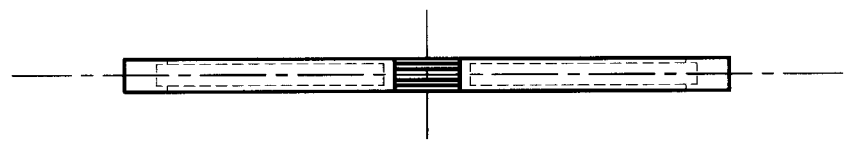
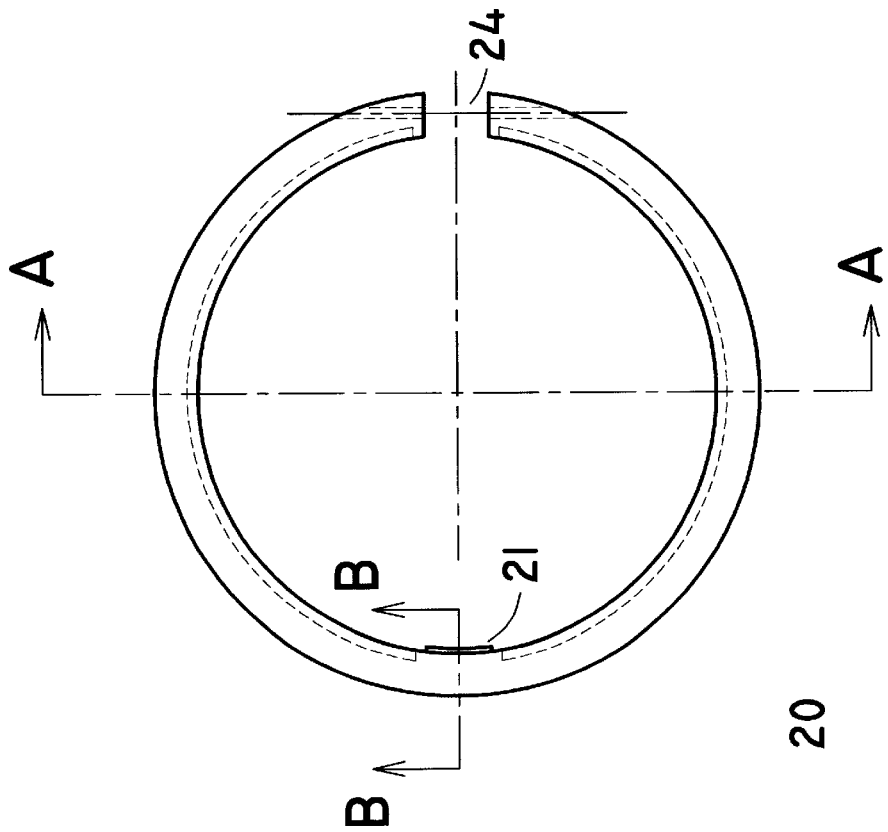

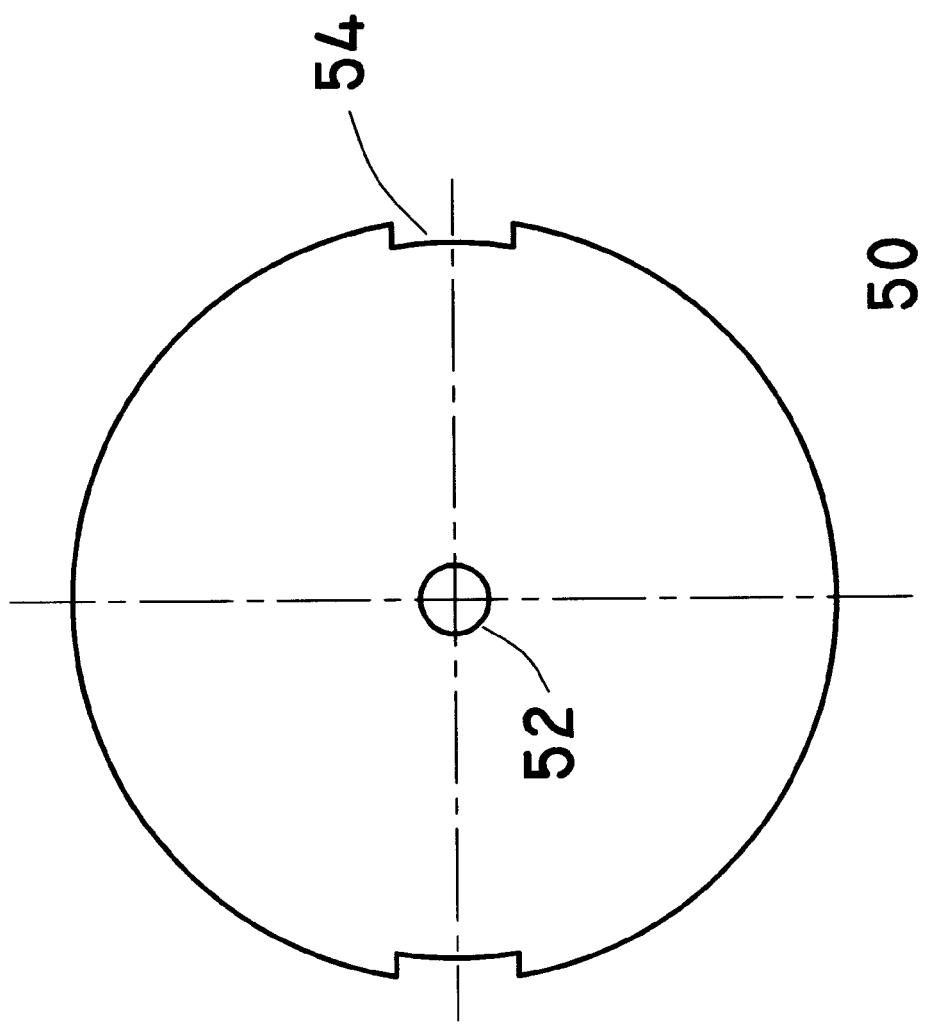

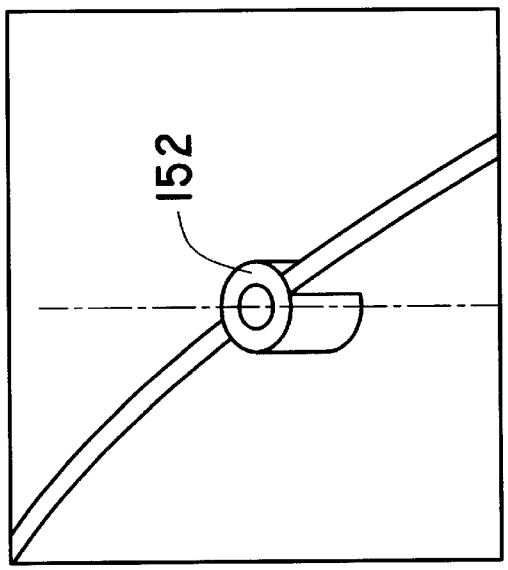
FIG. IIA
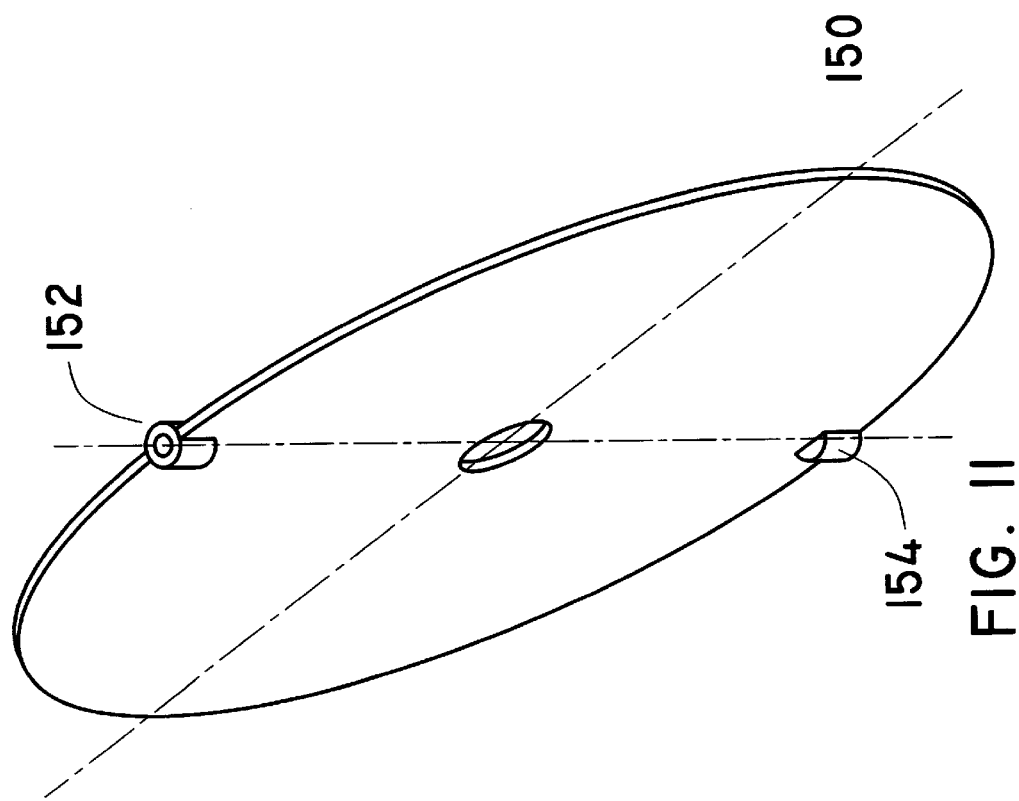
FIG. II

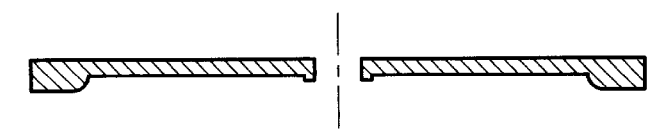
FIG. 14D
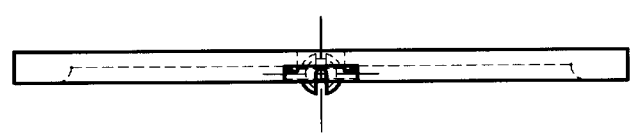
FIG. 14C
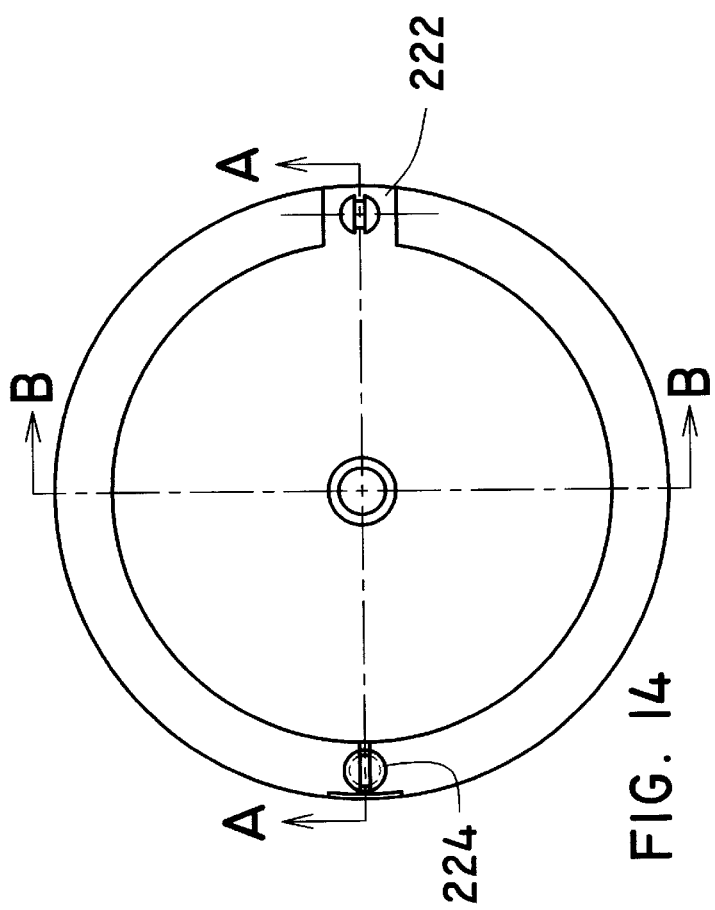
FIG. 14
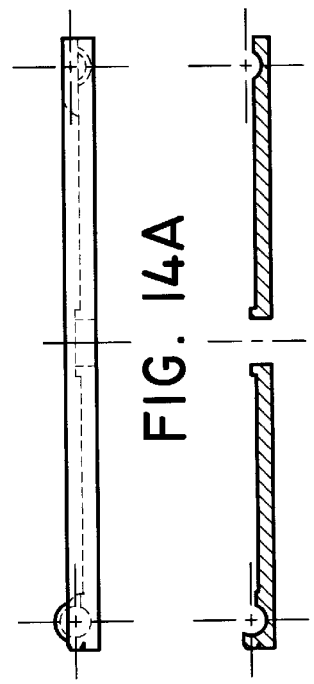
FIG. 14A
FIG. 14B

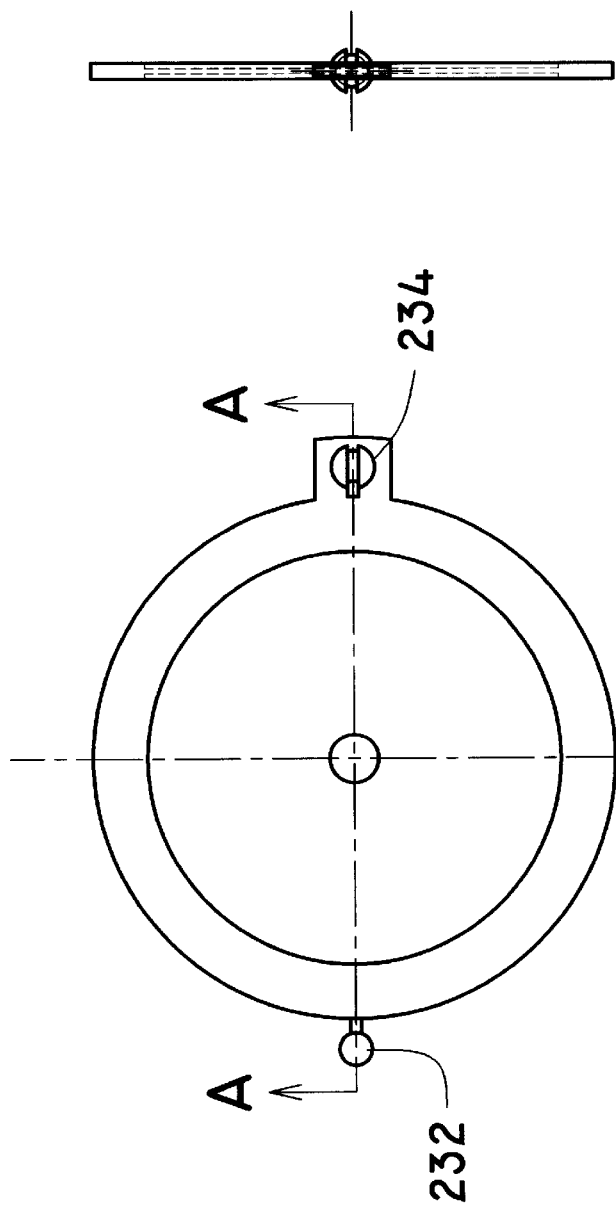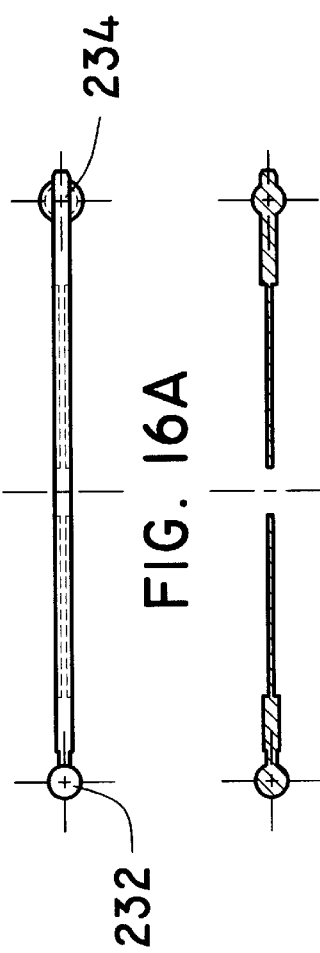

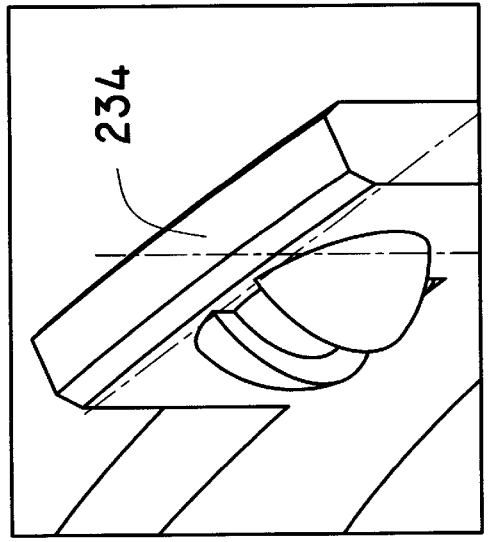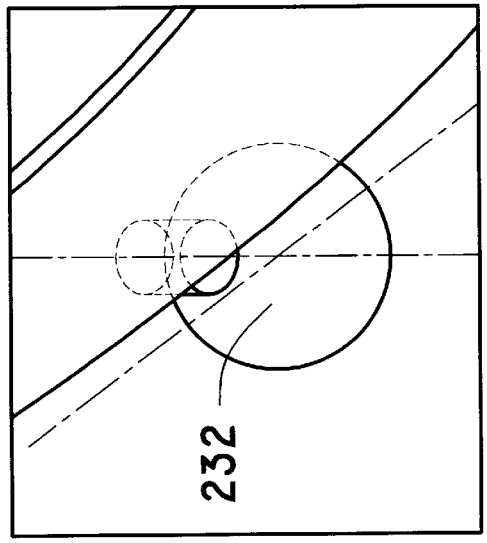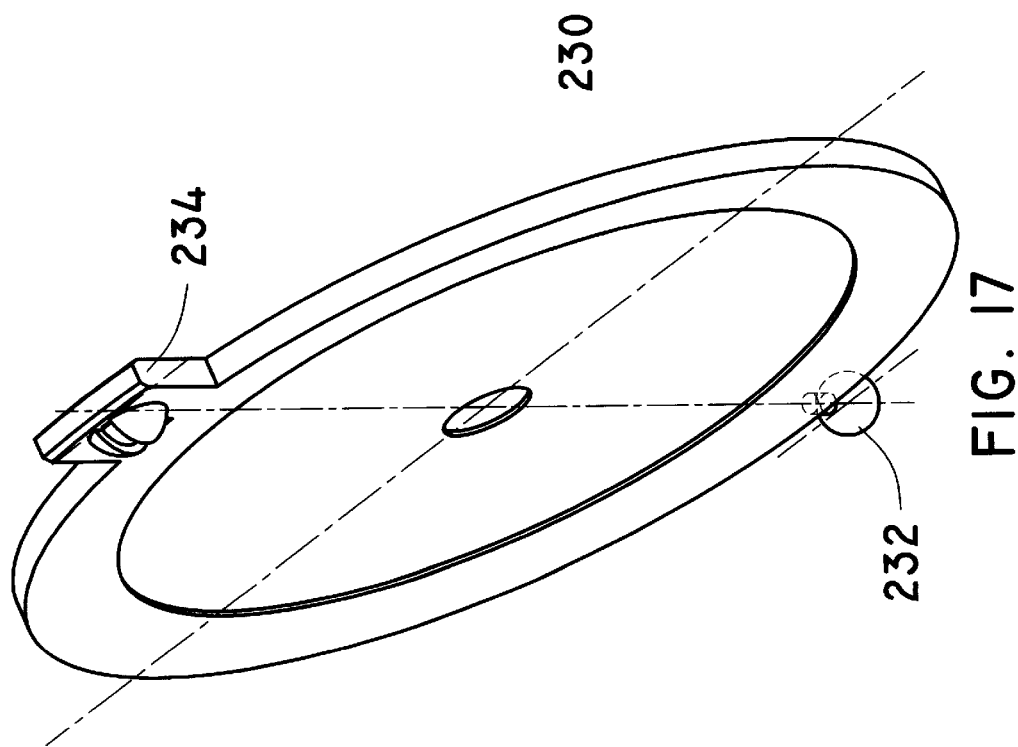

SELF-CONTAINED, MULTI-AXIS RECORDABLE AND STORAGE APPARATUS

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

BACKGROUND OF THE INVENTION

1. Field of the Invention

Typical disc recording mediums and the protective cover or container therefore involve separate components which are either collectively insertable into a device to read from or write to the medium or which must be separated prior to inserting the medium in to a reading or writing device. These apparatus range from the shutter cartridge devices, such as U.S. Pat. No. 6,377,538 B1 to the protective cartridge of U.S. Pat. No. 6,118,757. Compact disk containers in the art typically include a base with a cover pivotally connected to one side of the base. Some engaging means is provided in the base to secure the disk within the container. Cartridges in the art which protectively contain disks and which are inserted directly into disk reading or writing drives use shutters or sliding doors to expose a portion of the disk to the reading or writing device.

The prior art is limited in that there is no self-contained, multi-axis recordable and storage apparatus which will universally adapt to all existing reading or writing devices and ultimately provide ease and convenience to the manufacturer and end user. Additionally, there is no such apparatus which will accept existing recorded medium, analog or digital, and allow its own protective cover/container to be physically inserted as a unitary assembly into playing, reading, or writing devices.

2. Description of the Related Art including Information Disclosed under 37 C.F.R. 1.97 and 1.98

A search of the prior art located the following United States patents which are believed to be representative of the present state of the prior art: U.S. Pat. No. 6,377,538 B1, issued Apr. 23, 2002, U.S. Pat. No. 6,298,986 B1, issued Oct. 9, 2001, U.S. Pat. No. 6,256,168 B1, issued Jul. 3, 2001, U.S. Pat. No. 6,205,115 B1, issued Mar. 20, 2001, U.S. Pat. No. 6,118,757, issued Sep. 12, 2000, U.S. Pat. No. 6,077,583, issued Jun. 20, 2000, U.S. Pat. No. 6,021,031, issued Feb. 1, 2000, U.S. Pat. No. 6,005,755, issued Dec. 21, 1999, U.S. Pat. No. 5,903,542, issued May 11, 1999, U.S. Pat. No. 5,787,069, issued Jul. 28, 1998, European Patent Application EP 0 843 310 A1, published Apr. 20, 1998, U.S. Pat. No. 4,387,807, issued Jun. 14, 1983, and U.S. Pat. No. 3,547,342.

BRIEF SUMMARY OF THE INVENTION

There is presently a need for a self-contained, multi-axis recordable and storage apparatus which will universally adapt to all existing reading or writing devices, to save time, effort and materials. Additionally, there is a need for such an apparatus which will accept existing recorded medium, analog or digital, and allow the protective container to be inserted into playing, reading, or writing devices.

It is, therefore, an objective of the present invention to provide convenience to the manufacturer and end-user by combining the container and the recording medium into one device wherein the operator/user might record, store, protect, insulate, encapsulate, read, run and play an analog recording of music, voice, or any audible sound, such as a phonograph-type etched record, etc., within its own integrated and inter-related functioning components.

It is another objective of the present invention to provide convenience to the manufacturer and end-user by combining the container and the recording medium into one device wherein the operator/user might record, store, protect, insulate, encapsulate, read, run and play a digital recording of music, voice, data, software application, and/or video, using laser optics, a magnetic film, or other recordable film materials within its own integrated and inter-related functioning components.

It is another objective of the present invention to provide convenience to the manufacturer and end-user by combining the container and the recording medium into one device wherein the operator/user might record, store, protect, insulate, encapsulate, view and transfer photographic film slides, pictures, photo, anti-static film, magnetic objects, or other visual art or readable print media within its own integrated and inter-related functioning components.

It is another objective of the present invention to provide convenience to the end-user by combining the protective cover/container with the stored useful medium/device into a unitary assembly wherein the user might record, protect, insulate, encapsulate, view and/or transfer a two or three-dimensional mold, artwork, machining plate, printing fixture and/or any useful and storable material within its own integrated and inter-related functioning components.

It is yet another objective of the present invention to provide convenience to the end-user by combining the protective cover/container with the stored useful medium/device into a unitary assembly wherein the user might protect, insulate, encapsulate and utilize other man-made or natural materials such as: (i) any electronic/electrical assembly, integrated circuitry and/or very large-scale integrated circuits or printed circuit boards; (ii) any medical or experimental specimen and/or sample; (iii) chemical and/or biological material in either liquid or solid form; (iv) any edible food or object in liquid or solid form; (v) any man-made solid object including, but not limited to, lenses, rings, coins, chips, other types of jewelry, etc.; (vi) any organic or non-organic object; and (vii) another mechanical or electronic device including, but not limited to, a watch, a personal digital assistant, a cell phone, a computer, an electronic handheld device, a directional compass, a camera, a video monitor screen, an electronic book, a toy, etc.

It is yet an additional objective of the present invention to provide the end user increased utility and ease of operation by: (i) providing a more convenient loading and unloading movement when the invention is used with a variety of digital or analog recording or play-back devices, for example, with floppy disk, compact disk/polygon, VCD, DVD, zip disk, or record phonograph media; (ii) weighing less, thus allowing the user to transport more devices; (iii) requiring less storage space; (iv) being more portable; (v) storing foreign solid/liquid natural or man-made objects; and (vi) preventing the container from being physically separated or misplaced from the content medium.

It is an additional objective of the present invention to provide a unitary container/recording medium which is scratch/dust/dirt proof and impact resistant.

It is yet another objective of the present invention to provide a unitary container/recording medium which is compact in design, does not contain unnecessary void and unusable spaces, and does not use excess raw materials, thus leading to an efficient manufacturing and assembly process of the product against conventional disks with separate protective containers that exist in the market today. The possible increased efficiency manufactured product applications include, without limitation, the storage of materials for use in analog, digital, or optical recordings of voice, data, sound, software applications, video, and other useful objects according to the end user's intentions.

It is still another objective of the present invention to provide a unitary container/recording medium which is very portable and which can be carried around by a person anywhere including physically storing the device in the user's pocket or wallet.

It is yet another objective of the present invention to provide a unitary container/recording medium which occupies less space when stacked or placed individually or in bulk for increased and more efficient physical storage and access.

It is also another objective of the present invention to provide manufacturing benefits or advantages as a result of a device that is: (i) faster and easier to assemble; (ii) simple to manufacture compared to other existing products in the art; (iii) smaller and more compact as compared to other existing products in the art with a separate container and a separate recording medium; and (iv) easier to transport.

Other features, advantages, and objects of the present invention will become apparent with reference to the following description and accompanying drawings.

BRIEF DESCRIPTION OF DRAWINGS

The foregoing summary, together with the following detailed description of various embodiments, is better appreciated and understood when considered together with the appended drawings. For the purpose of illustrating the invention, the drawings illustrate an embodiment that is presently preferred, and two related embodiments. The invention is not limited, however, to the specific methods or instrumentalities disclosed in the drawings. In the drawings:

FIG. 2 is a top view of the external frame component of an embodiment of the present invention.

FIG. 2A is a right side view of the external frame component of an embodiment of the present invention.

FIG. 2B is a vertical cross-sectional view taken in the cutting plane line A—A of FIG. 2 showing the inner recessed portion of the external frame component.

FIG. 2C is a horizontal cross-sectional view in the cutting plane line B—B of FIG. 2 showing the snap-on type/interference fit locking and securing mechanism as an embodiment of the external frame component.

FIG. 2D is a detailed front view section of FIG. 2 showing the opening which houses the external frame shaft.

FIG. 2E is a detailed top view section of FIG. 2 showing the opening along the circumference of the external frame component which accepts the hinged component arm.

FIG. 3 is a top view of the internal component of an embodiment of the present invention.

FIG. 11 is a perspective view of the internal component of another embodiment of the present invention.

FIG. 11A is a perspective detailed view of one of the opposing holes along the circumference of the internal component of another embodiment of the present invention.

FIG. 14 is a top view of an external frame component of a third embodiment of the present invention.

FIG. 14A is a front view of a third embodiment of the present invention.

FIG. 14B is a cross-sectional view along the cutting plane line A—A of FIG. 14 of an external frame component of a third embodiment of the present invention.

FIG. 14C is a right side view of an external frame component of a third embodiment of the present invention.

FIG. 14D is a cross-sectional view along the cutting plane line B—B of FIG. 14 of an external frame component of a third embodiment of the present invention.

FIG. 16 is a top view of a hinged component of a third embodiment of the present invention.

FIG. 16A is a front view of a hinged component of a third embodiment of the present invention.

FIG. 16B is a horizontal cross-sectional view along cutting plane line A—A of a hinged component of a third embodiment of the present invention.

FIG. 16C is a right side view of a hinged component of a third embodiment of the present invention.

FIG. 17 is a perspective view of a hinged component of a third embodiment of the present invention.

FIG. 17A is a detailed perspective view of the protruding locking arm of the hinged component of a third embodiment of the present invention.

FIG. 17B is a detailed view of the ball joint shaft and hinge element of a hinged component of a third embodiment of the present invention.

DETAILED DESCRIPTION OF THE INVENTION

Figure 1:
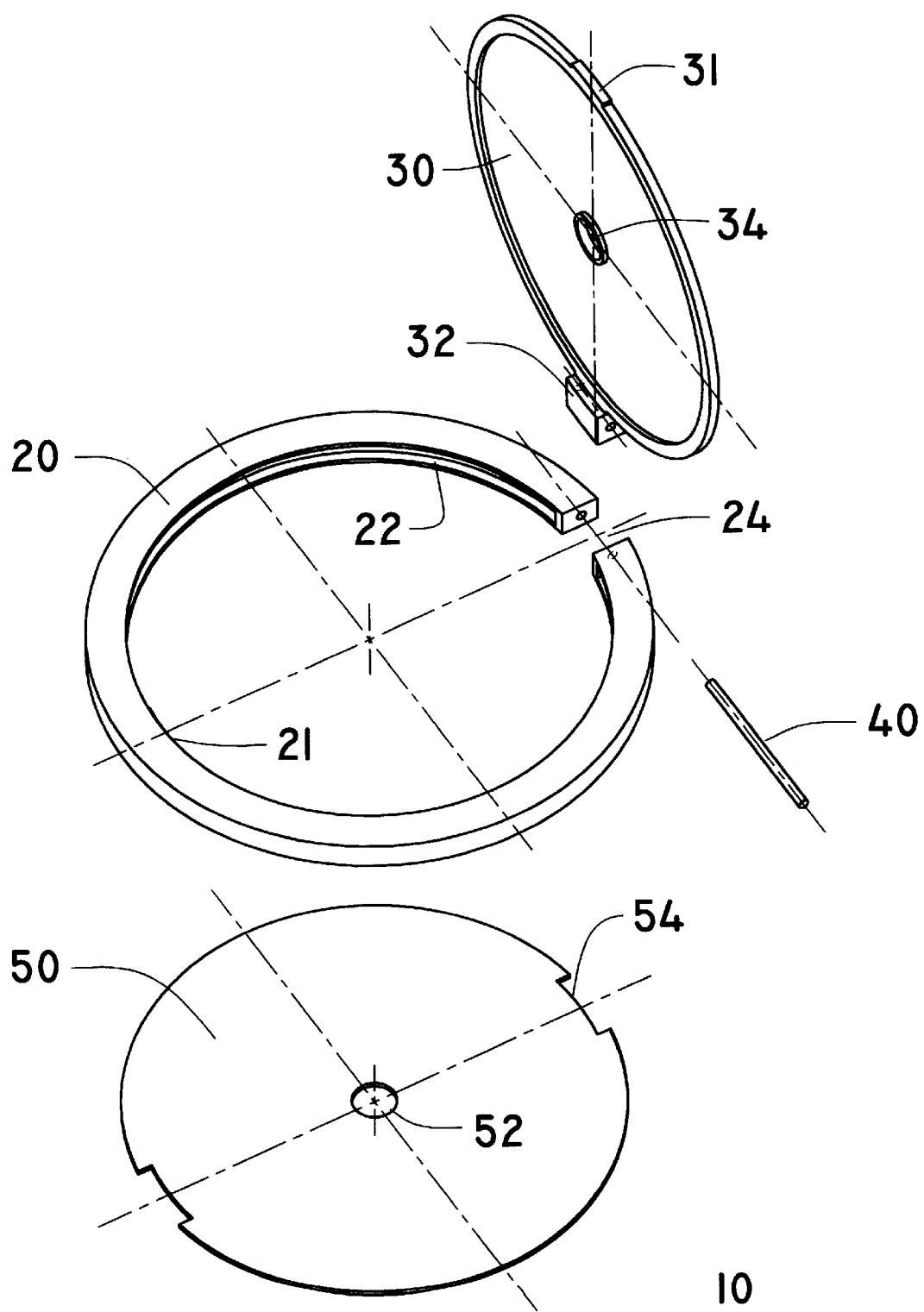
FIG. 1 is an exploded perspective view showing the components of an embodiment of the present invention.

As shown in FIGS. 1–5, 5A, 5B, 5C, 6, and 7 an embodiment of the present invention 10 includes a hinged component 30 or 30B which is a flat or three dimensionally shaped solid material. The hinged component 30 or 30B is connected, attached, secured, welded, fastened or connected along the edge of the said hinged component's circumference or perimeter to a hinge arm 32 and external frame shaft 40, as depicted in FIGS. 1, 5, 5A, 5B, 5C, and 6, which can rotate 360 degrees on a living hinge axis 24.

Figure 5C:
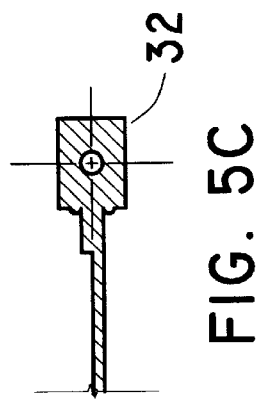
FIG. 5C is a detailed cross-section view of the hinge arm and hole of the hinged component of an embodiment of the present invention.
Figure 5:
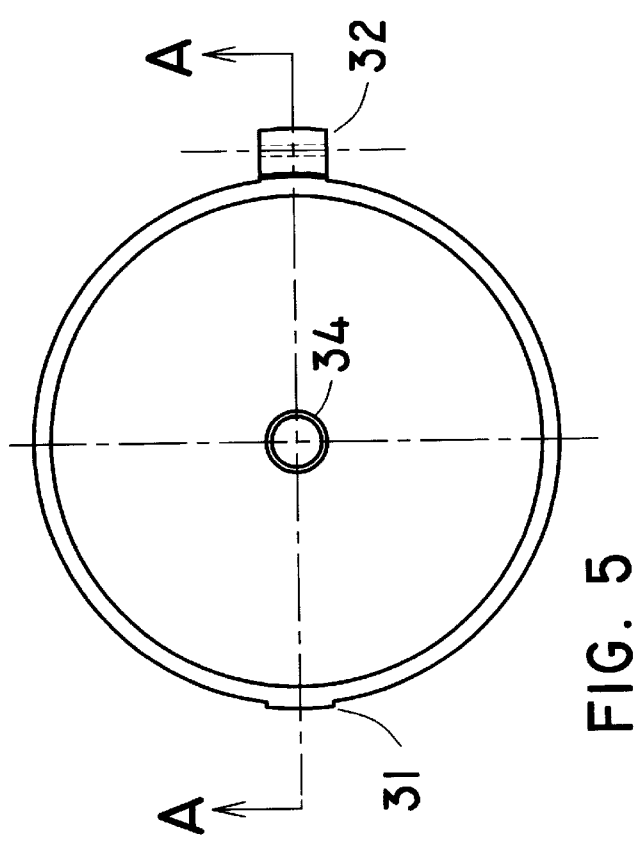
FIG. 5 is a top view of the hinged component of an embodiment of the present invention.
Figure 5A:
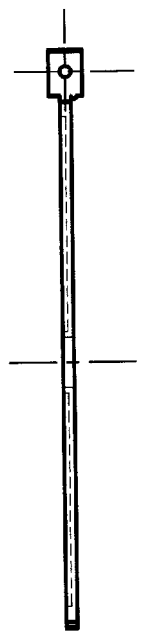
FIG. 5A is a front view of the hinged component of an embodiment of the present invention.
Figure 5B:
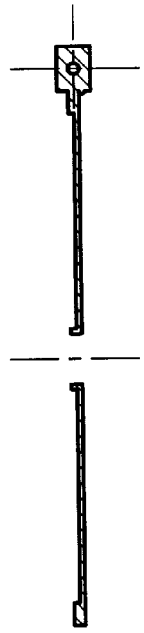
FIG. 5B is a horizontal cross-sectional view along the cutting plane line A—A of the hinged component of an embodiment of the present invention.
Figure 6:
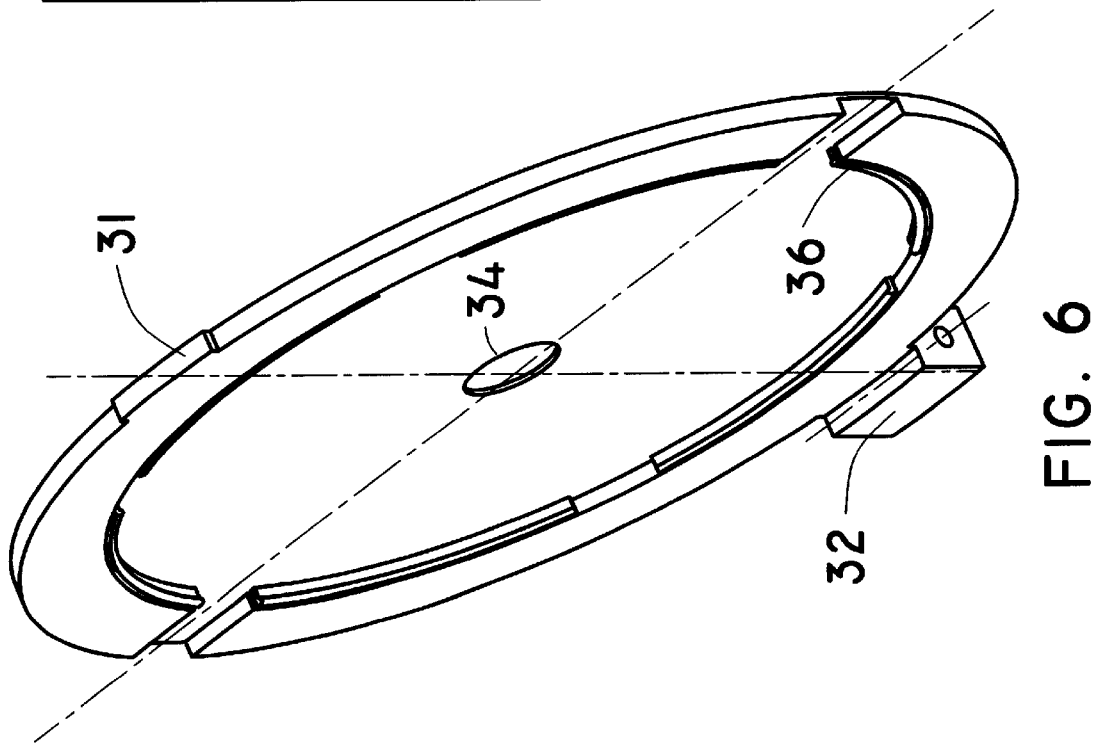
FIG. 6 is a perspective view of an alternate hinged component of an embodiment of the present invention.

Both faces of this hinged component 30 or 30B can serve as a protective cover plate and/or a recording/storage medium. The faces of the hinged component 30 or 30B also provide a support structure for the inner component 50 when the device 10 is completely opened or closed. The device is completely opened or closed by rotating the hinged component 30 or 30B 360 degrees about a living hinge rotating from a center axis 24, located and positioned at the center axis of the external frame shaft 40. Additionally, as shown in FIGS. 1, 5, and 6, the faces of the hinged component 30 or 30B function as an opening and closing drive mechanism. The hinged component 30 or 30B may drive the inner component 50 in a limited linear or semi-circular direction inside the external frame inner recessed slot 22. A protruding arm 31 of the hinged component 30 or 30B secures the apparatus 10 using either an interference fit, spring loaded, or a snap on type of mechanism that mates and operates actively and congruently with the external frame member 21.

The hinged component 30 or 30B may include a round or polygon-shaped hole 34, protruding shaft, boss, gear, and/or a recessed surface. These features can be placed or added concentrically to share a common center point with the circumference and/or perimeter of the device 10. A boss can be added and provided for the hinged component 30 or 30B to prevent foreign objects such as dust, dirt, and grime from entering one of the faces of the inner component 50 or the hinged component 30 or 30B. A recessed surface on either side of the hinged component's 30 or 30B faces can be added to prevent physical damage such as scratches from occurring on the surfaces of either the hinged component 30 or 30B or the inner component 50. A concentric round/polygon hole 34, gear, or protruding shaft can be added to serve as an axis of rotation for various intended rotary functions, as used with or for digital video disk/polygon drives, compact disk/polygon drives, video compact disk/polygon drives, analog phonograph read/record drives, floppy, zip, or magnetic film drives, film reels, spools, or other external rotary drive devices.

The hinged component 30 or 30B may include sealing, fastening, air-tightening, anti-exposure, anti-contaminating part mechanisms, by way of adding a threaded hole/shaft, rubber seal, or any sealing feature that mates with the inner component 50. This feature, when added to the apparatus of an embodiment of the present invention 10, prevents foreign matter from damaging, entering or penetrating the apparatus when the device 10 is completely closed.

Figure 7:
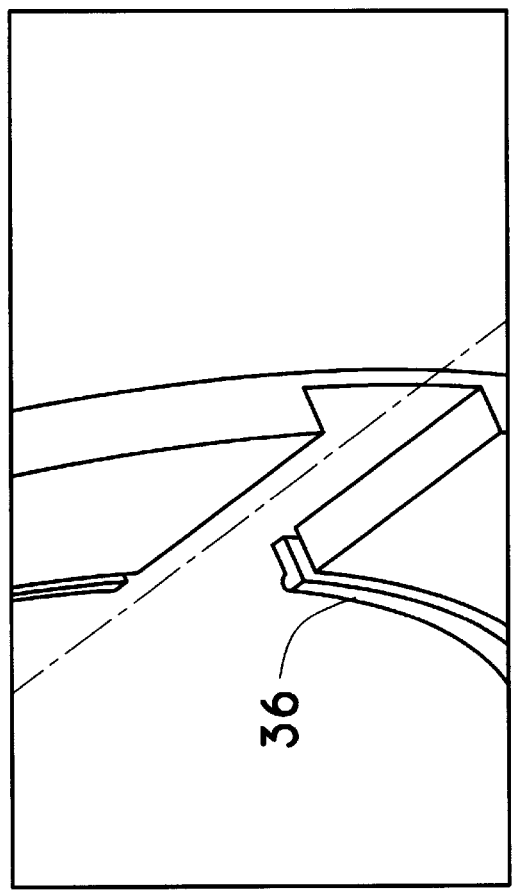
FIG. 7 is a perspective detail view of an element of an alternate hinged component of an embodiment of the present invention.

As shown in FIG. 6, a snap-on or slotted hole locking and securing mechanism 36 can be added and positioned concentrically to the hinged component 30 or 30B and external frame 20 to hold and secure, with or without an adhesive, any existing digital or analog recording disks available in the market today. As depicted in FIGS. 6 and 7, this snap-on/slotted hole type securing mechanism feature 36 can be placed and added on the hinged component 30 and positioned along the attached analog or digital disks' outside and/or inside circumference/perimeter, to functionally engage with the apparatus 10 and thus can operate with an external rotary read, record, or write drive player or machine.

As shown in FIGS. 1 and 3, the inner component 50 of an embodiment of the present invention 10 is a flat or three dimensionally shaped solid material. This is a component that moves in a limited sliding-fit linear or semi-circular motion which is attached, secured, fastened, connected, and confined within a slot 22 inside the external frame 20 inner diameter. This movable inner component 50 is placed concentrically to the center of the circumference or perimeter of the external frame 20. This inner component 50 linear displacement motion is centered and concentrically positioned on an axis along the central axial point of the external frame 20. Thus, using various medium options for the inner component 50 and the hinged component, 30 or 30B, the manufacturer and end user can easily record, store, protect, insulate, encapsulate, read, run and play a digital or analog recording of music, voice, data, software application, and/or video, using laser optics, a magnetic film, or other recordable film materials within its own integrated and inter-related functioning components. Similarly, by combining the container and the recording medium in all the various embodiments of the present invention, the manufacturer and end user can also use the apparatus to record, store, protect, insulate, encapsulate, view and transfer materials, such as photographic film slides, pictures, photo, anti-static film, magnetic objects, other visual art or readable print media, or other useful devices or objects within its own integrated and inter-related functioning components.

Both faces of this inner component 50 share a common center point and are concentrically located and positioned along the center of the hinged component 30 or 30B and the external frame 20. The inner component 50 serves as: (i) a base support structure plate when the apparatus 10 is either completely closed or opened; (ii) a material/film storage and/or recording medium on one or both of its faces; and (iii) an open or closing driving mechanism manually activated by the user. In the process of opening or closing the device 10, the inner component 50 partially drives and displaces the hinged component 30 or 30B by way of a slight external manual force. Slight pressure and/or release of a mechanically activated locking mechanism causes the hinged component 30 or 30B to swing open and hence rotate in a 360 degrees direction about the axis of a living hinge on the external frame shaft 40.

The opening and closing action for this embodiment of the present invention 10 is fully achieved by pushing, pulling or driving the hinged component 30 or 30B circularly around the axis of the external frame shaft 40. During an opening or closing motion, the inner component 50, remains confined and moves within a limited space inside the external frame 20 by means of a circular or polygon shaped hole slot 22 sliding fit feature. This inner component 50 functions as a circular or polygon shaped shaft and operates congruently with the external frame's inner circular or polygon shaped three-dimensional recessed hole slot 22.

The inner component 50 also serves as either a protective cover or container for the apparatus 10 to store or record any material or other usable objects on either one of its sides or faces.

The inner component 50 may include a round or polygon hole 52, protruding shaft, gear, boss, and/or a recessed surface edge 54. These features can be placed or added concentrically to share a common center axis point with the outside circumference or perimeter of the external frame 20. A boss can be added and used to prevent foreign objects such as dust, dirt, and grime from entering either one of the faces of the inner component 50 and the hinged component 30 or 30B. Recessed planar surfaces on either faces of the inner component 50 can be added to prevent the occurrence of scratches on the surfaces of either the inner component 50 or the hinged component 30 or 30B. A concentric round/polygon hole 52, gear, or protruding shaft can serve as an axis of rotation for various intended rotary functions, as used with or for digital video disk/polygon drives, compact disk/polygon drives, video compact disk/polygon drives, analog phonograph record drives, floppy, zip, or magnetic film drives, film reels, spools or any other rotary read, write, or record drive devices.

The inner component 50 may include sealing, fastening, air-tightening, anti-exposure, anti-contaminating part mechanisms, by way of adding a threaded hole/shaft, rubber seal, or any sealing feature that mates with the hinged component 30 or 30B. These features, when added to the apparatus 10 can prevent any foreign matter from damaging, entering or penetrating the device when it is in a completely closed state.

A snap-on or slotted hole locking and securing mechanism, with or without an adhesive, can be added and positioned concentrically to this inner component 50 and external frame 20 to hold and secure any existing conventional digital or analog recording disks available in the market today. This snap-on/slotted hole type securing mechanism can be placed and added on the inner component 50 and positioned along the attached digital or analog disk's outside and/or inside circumference or perimeter, for it to function with the apparatus 10 and with any engaged external rotary drive read, write, or record player or machine.

FIGS. 1, 2, 2A, 2B, 2C, 2D and 2E show the external frame 20 as a rounded circular or polygon object that holds and serves as the support structure for the inner component 50, external frame shaft 40 and the hinged component 30 or 30B. The external frame 20 is constructed with features to hold all the said individual components of the apparatus 10 securely in place. Within the circular or polygon internal diameter/hole opening of the external frame 20, there is a slotted recessed surface 22 to align, contain, and hold the inner component 50. In addition, the external frame 20 has a pathway opening 24 along its circumference or perimeter to accommodate and secure the hinged component arm 32, the external frame shaft 40, and the hinged component 30 or 30B.

The external frame 20: (i) supports, holds, stores and encapsulates the apparatus 10 components and holds the individual parts together for the device 10 to function correctly; (ii) serves as a driving and securing mechanism for the device 10 to be completely opened or closed and manually handled by the user; (iii) prevents foreign objects such as dust, lint, or grime from penetrating freely into the hinged component 30 or 30B, inner component 50 and the external frame shaft 40; (iv) holds any photographic, print, visual art, film, or magnetic material on any surface side of the material; (v) firmly secures the external frame shaft 40, which is either partly embedded, welded, attached, riveted, permanently glued, fastened, stapled, or secured on both of its ends to the interior sides of the pathway opening 24 of the external frame 20 into position and makes the whole apparatus assembly 10 structurally sound; (vi) has a locking feature 21 that mates with the hinge component 30 or 30B locking mechanism 31; (vii) serves as the component with a void pathway opening positioned along its circumference or perimeter, thus allowing the hinged component 30 or 30B of the apparatus 10 to rotate 360 degrees around the external frame shaft 40 center axis; and (viii) provides a slotted recess 22 with a sliding fit feature in the inside diameter surface of the external frame 20.

This slotted recess 22 serves as the pathway for the inner component 50 to move in a linear motion on an axis perpendicular to the diameter axis of the external frame 20 or by a semi-circular hinge-like action with an axial point located along the outer circumference or perimeter of the inner component 50. The external mechanical driving motion for this linear or semi-circular motion can either be a slight manual pressure or via an external mechanical driving mechanism.

Figure 4A:
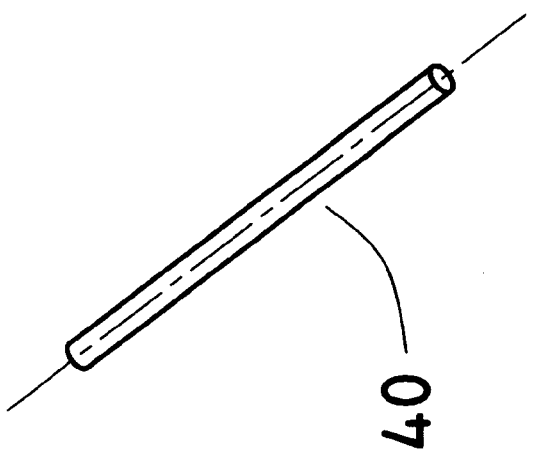
FIG. 4A is a perspective view of the external frame shaft component of an embodiment of the present invention.
Figure 4:
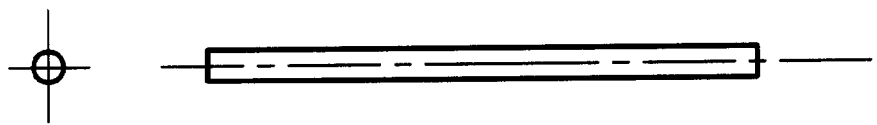
FIG. 4 is a top and front view of the external frame shaft component of an embodiment of the present invention.

The external frame shaft 40, FIGS. 4 and 4A, is a cylindrical shaped object having two ends. Both ends extend through, are secured by, and are fastened, welded, permanently glued, or otherwise attached inside the pathway opening ends 24 of the external frame 20. This external frame shaft 40 serves as a living hinge axis for the hinged component 30 or 30B to allow a rotation of 360 degrees around both planar faces of the external frame 20 and inner component 50, and thus facilitates the opening and closing of the entire apparatus assembly 10. The external frame shaft 40 is critical to securely position the hinged component 30 or 30B and structurally attach the hinged component 30 or 30B to the external frame 20, allowing the entire device assembly 10 to function correctly and properly. The location of the external frame shaft 40 is critical to permanently secure, fasten, weld or attach both the external frame 20 component's pathway opening ends 24 which are positioned along the circumference or perimeter of the external frame 20. This external frame shaft 40 feature, of attaching the external frame 20 pathway opening ends 24, enhances the structural integrity and durability of the entire apparatus assembly 10.

As such, the present invention 10, and embodiments thereof, 100, 200/230/230B, provide the end user increased utility and ease of operation by: (i) presenting a more convenient loading and unloading movement when the invention is used with a variety of digital or analog recording or play-back devices, for example, with floppy disk, compact disk/polygon, VCD, DVD, zip disk, or record phonograph media; (ii) weighing less, thus allowing the user to transport more devices; (iii) requiring less storage space; (iv) being more portable; (v) storing foreign solid/liquid natural or man-made objects; and (vi) preventing the container from being physical separated or misplaced from the content medium.

The apparatus 10, and embodiments thereof, 100, 200/230/230B, thus present a self-contained, multi-axis recordable and storage apparatus which will universally adapt to all existing reading or writing devices. Additionally, the apparatus 10, and embodiments thereof, 100, 200/230/230B, can accept existing recorded medium, analog or digital, and allows the protective container to be inserted into playing, reading, or writing devices.

Figure 8:
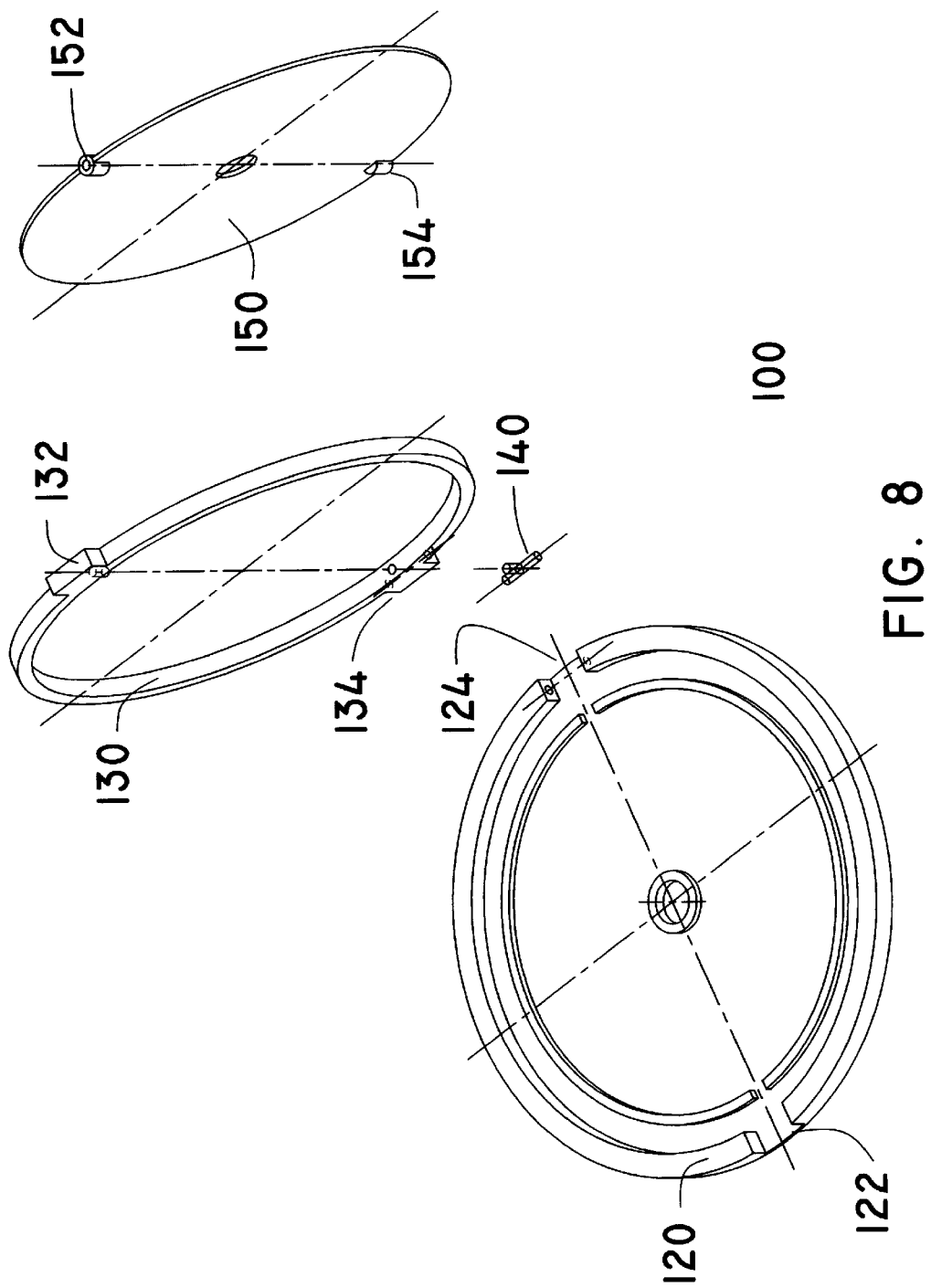
FIG. 8 is an exploded perspective view showing the components of another embodiment of the present invention.
Figure 9A:
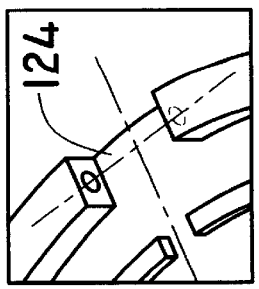
FIG. 9A is a perspective detailed view of the recessed opening to accept and house the external frame shaft along the circumference of the external frame component of another embodiment of the present invention.
Figure 9B:
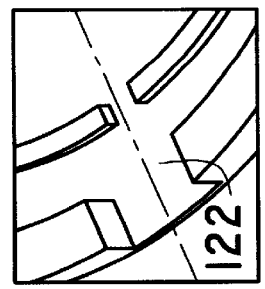
FIG. 9B is a perspective detailed view of a second recessed opening along the circumference of the external frame component of another embodiment of the present invention.
Figure 9:
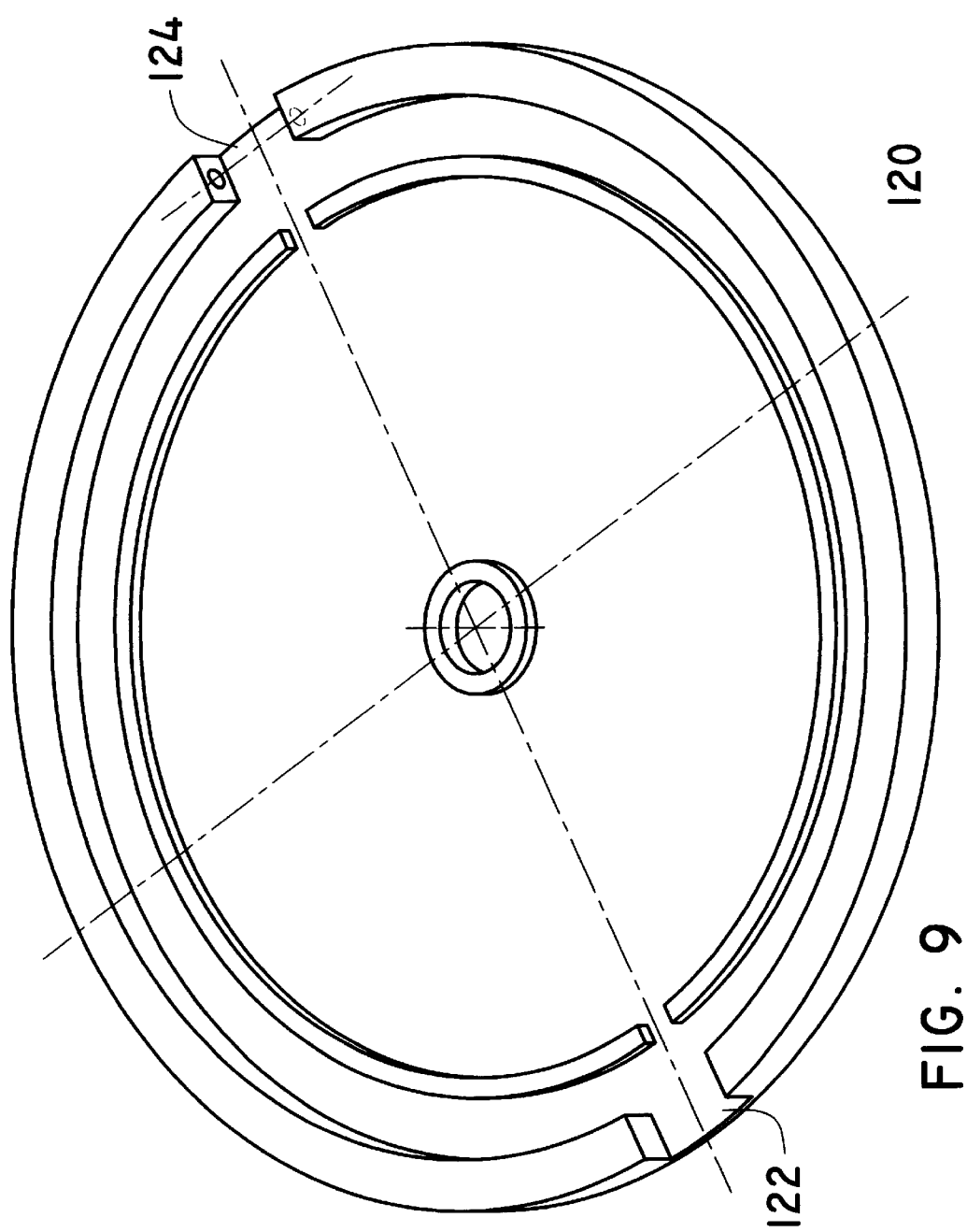
FIG. 9 is a perspective view of the external frame component of another embodiment of the present invention.
Figure 10A:
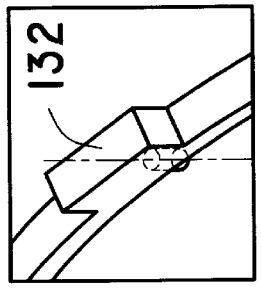
FIG. 10A is a perspective detailed view of the protruding member of the hinged component of another embodiment of the present invention.
Figure 10B:
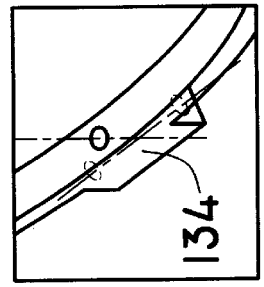
FIG. 10B is a perspective detailed view of the hinged arm member of the hinged component of another embodiment of the present invention.
Figure 10:
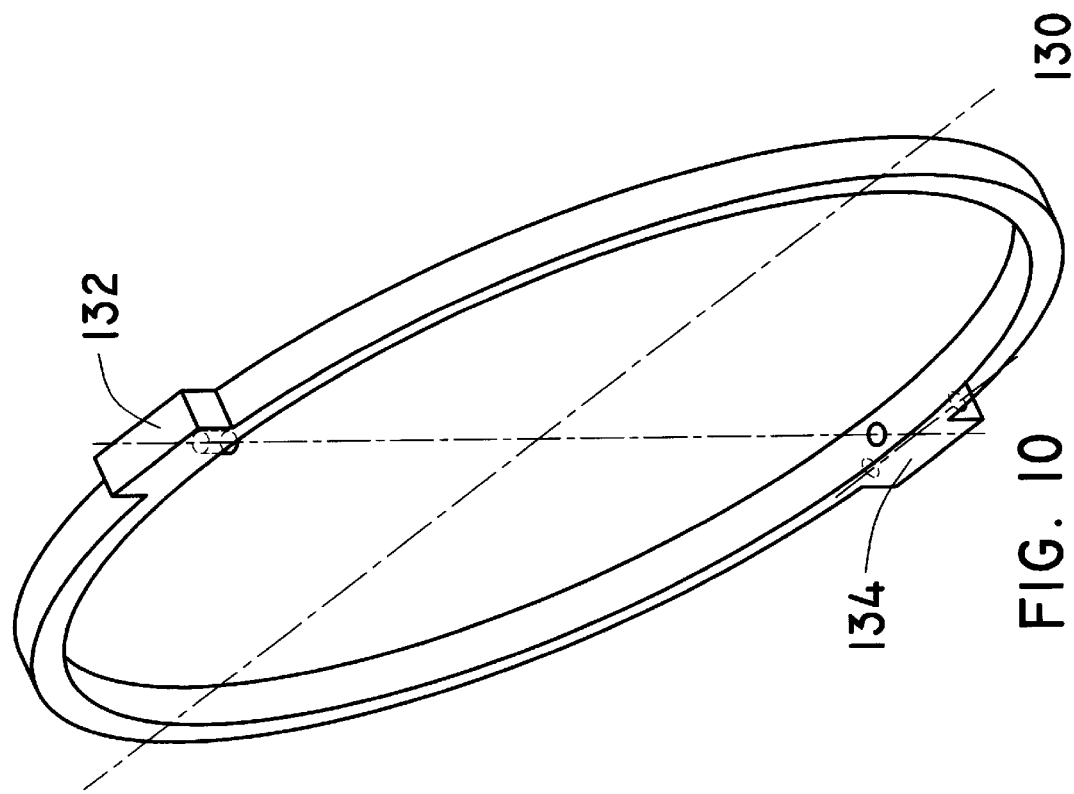
FIG. 10 is a perspective view of the hinged component of another embodiment of the present invention.
Figure 12A:
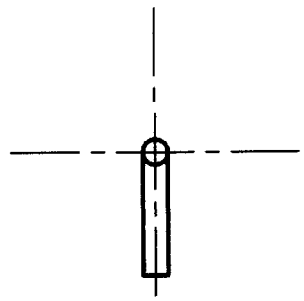
FIG. 12A is a front view of the external frame shaft component of another embodiment of the present invention.
Figure 12C:
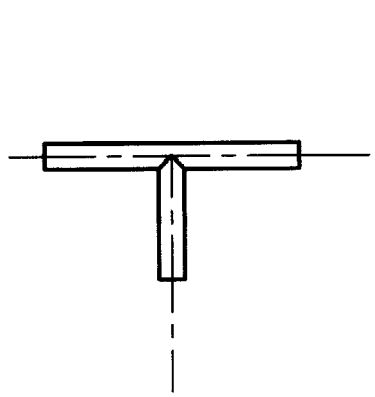
FIG. 12C is a top view of the external frame shaft component of another embodiment of the present invention.
Figure 12B:
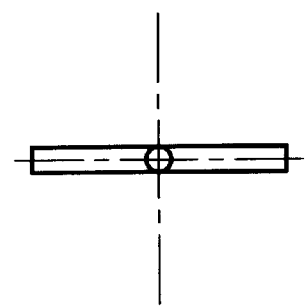
FIG. 12B is a left side view of the external frame shaft component of another embodiment of the present invention.
Figure 12:
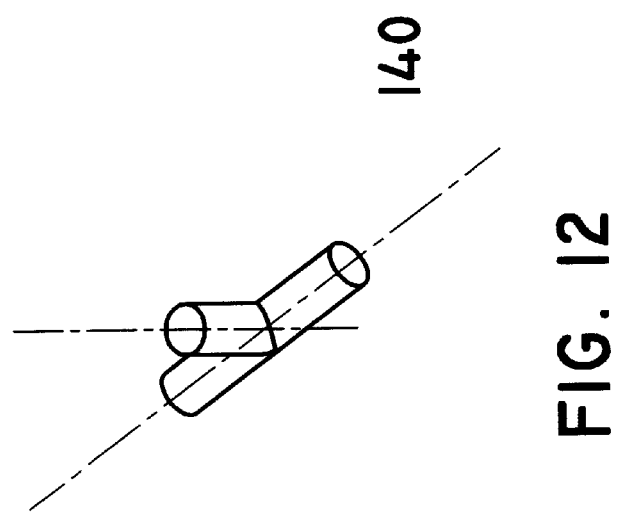
FIG. 12 is a perspective view of the external frame shaft component of another embodiment of the present invention.
Figure 13A:
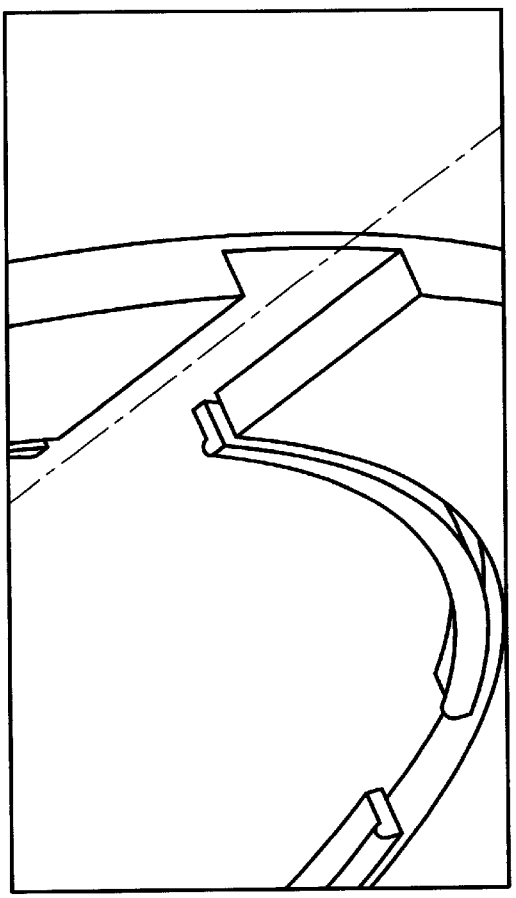
FIG. 13A is a perspective detail view of an alternate internal component showing the inner disk locking mechanism and opening along the circumference of the component.
Figure 13:
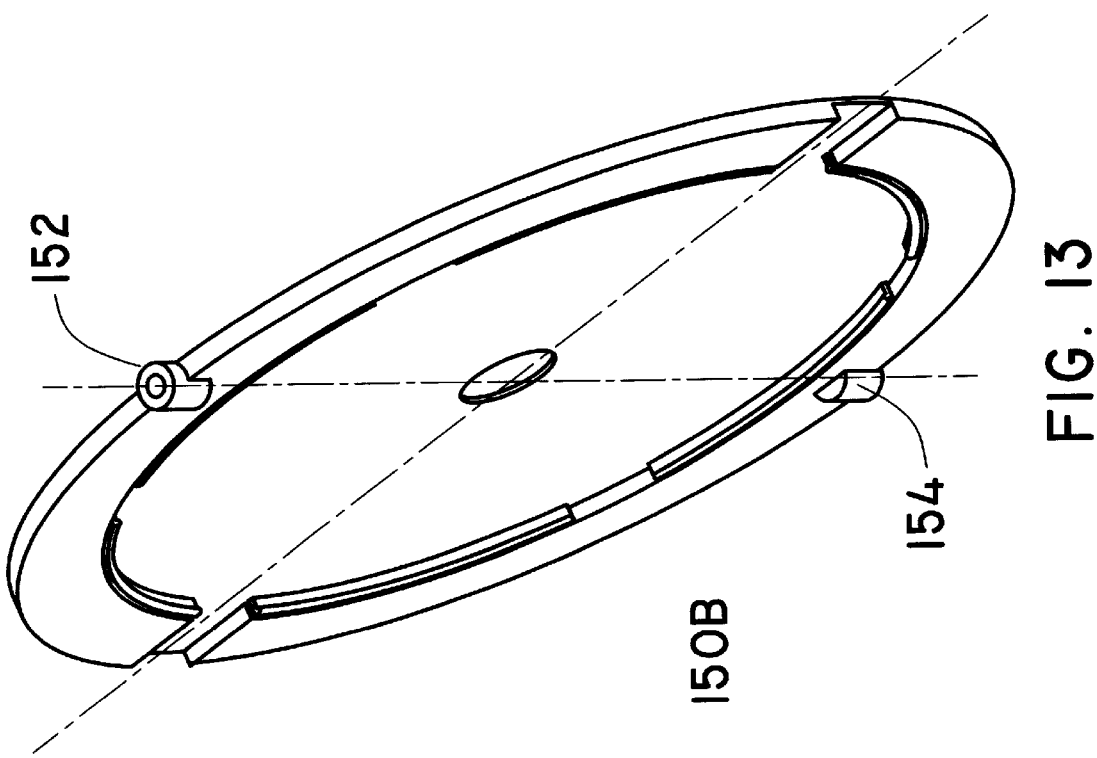
FIG. 13 is a perspective view of an alternate internal component of another embodiment of the present invention.
Figure 15A:
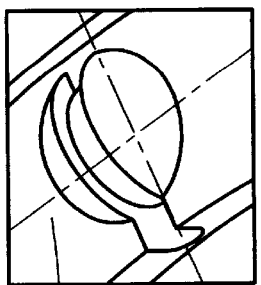
FIG. 15A is a detailed view of the spherical cavity of an external frame component of a third embodiment of the present invention.
Figure 15B:
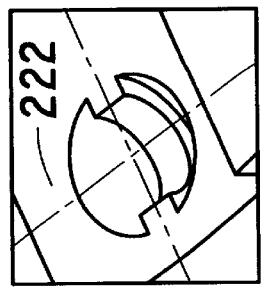
FIG. 15B is a detailed view of the external frame pathway opening of an external frame component of a third embodiment of the present invention.
Figure 15:
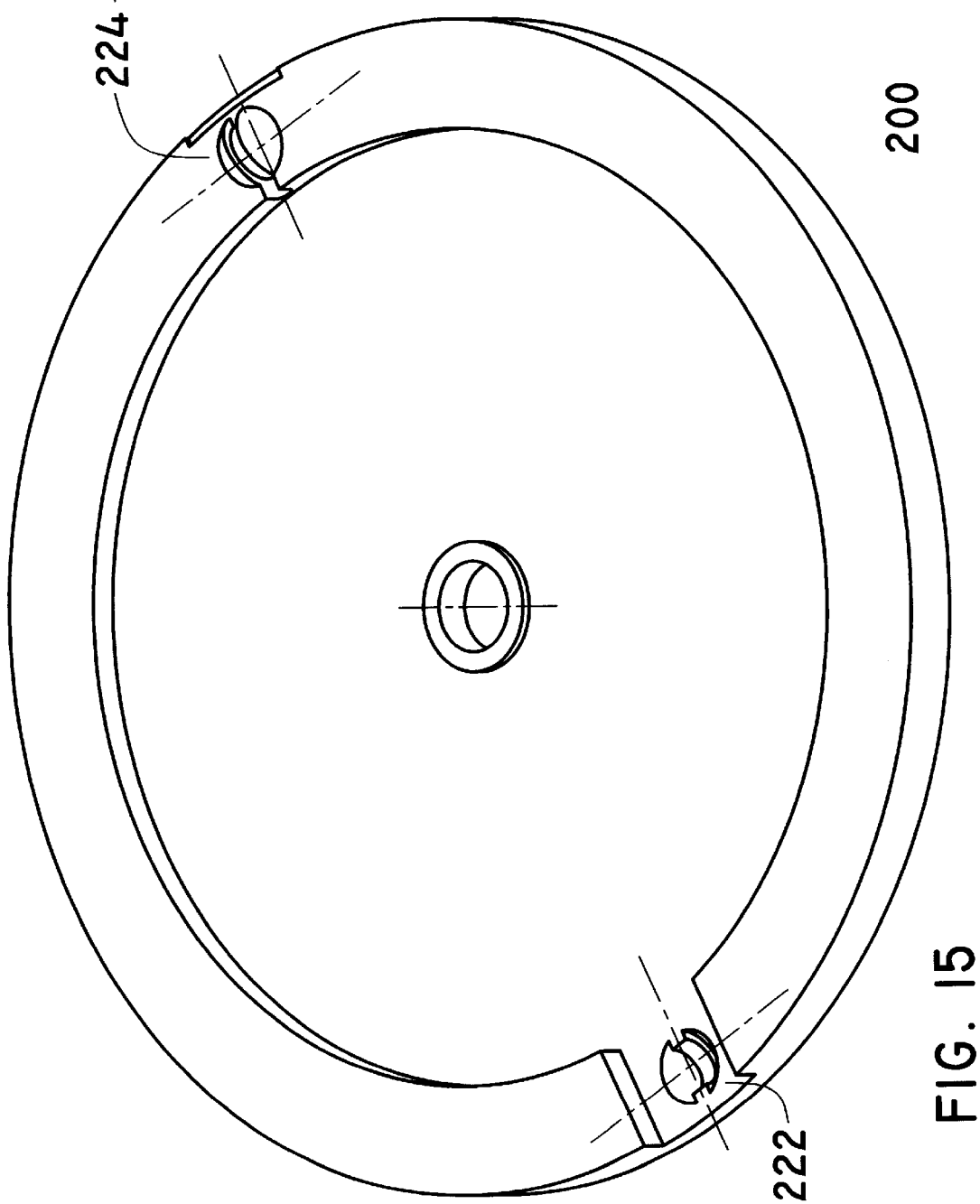
FIG. 15 is a perspective view of an external frame component of a third embodiment of the present invention.
Figure 18A:
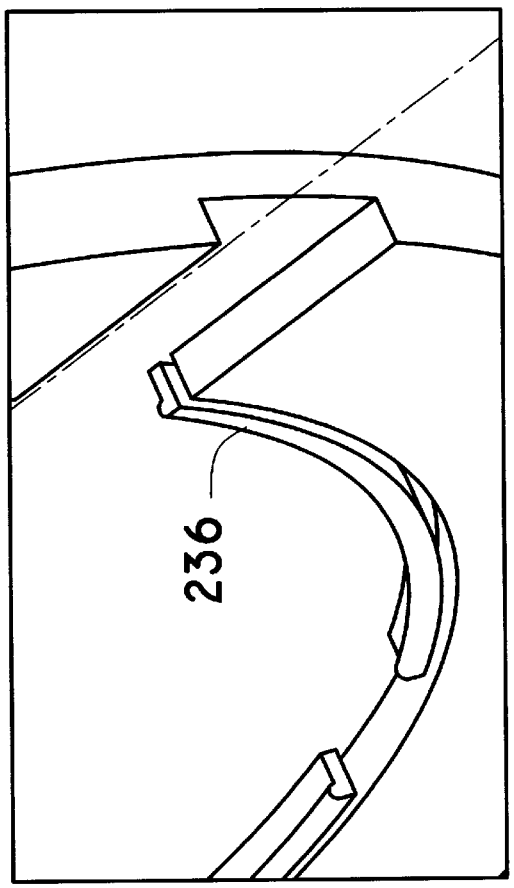
FIG. 18A is a detailed view of an alternate hinged component of a third embodiment of the present invention showing the inner disk locking mechanism and opening along the circumference of the component.
Figure 18:
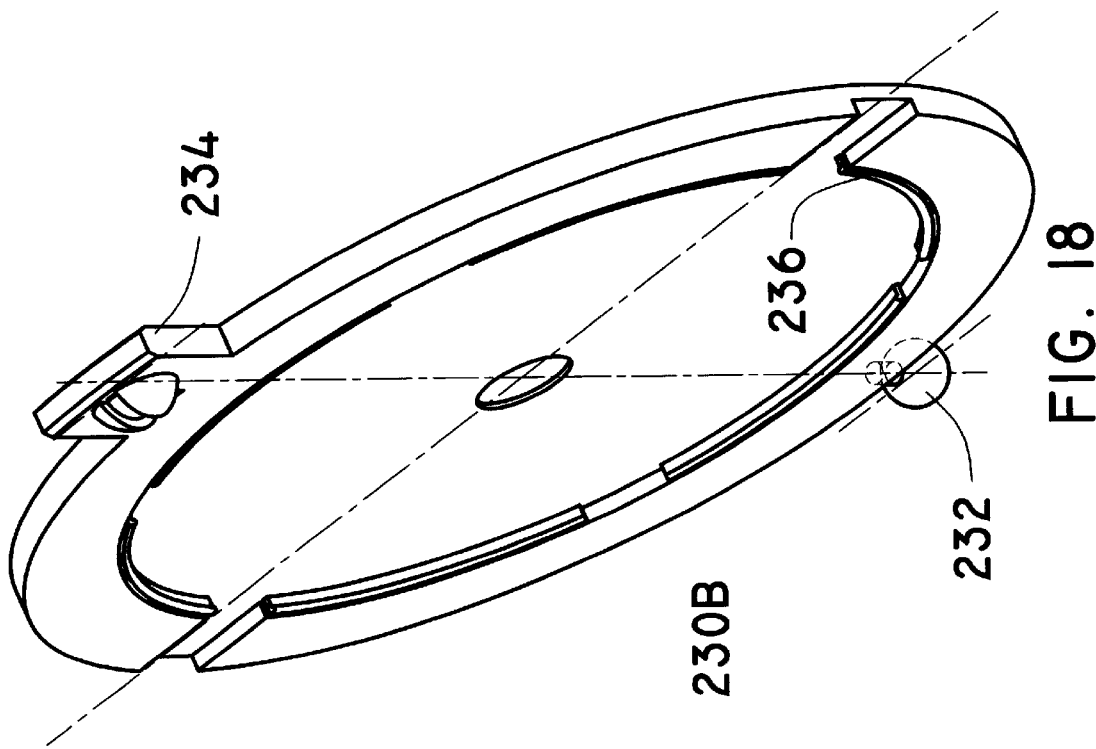
FIG. 18 is a perspective view of an alternate hinged component of a third embodiment of the present invention.

In a second embodiment of the present invention 100 shown in FIG. 8, the hinged component 130, FIGS. 10, 10A and 10B, is a three dimensionally shaped solid material and is connectively attached, secured, welded, fastened or otherwise connected along the edge of its circumference or perimeter to a hinged component arm 134 and external frame shaft 140 that can rotate 180 degrees on a living hinge axis 124. This hinge component 130 has two opposing shafts in its inner diameter surface to hold and rotate the inner component 150 or 150B. As shown in FIGS. 8 and 10, directly opposite the hinged component arm 134 of the hinged component 130 and external frame shaft 140 and part of the hinged component 130, a protruding material member 132 extends outward to serve either as a locking, snapping, spring-loaded, or fastening mechanism that operates congruently with a recessed portion 122 of the external frame 120, depicted in FIGS. 8, 9, 9A and 9B.

As shown in FIGS. 8, 11, 11A, 13, and 13A the inner component 150 or 150B for this second embodiment 100 is a flat or three dimensionally shaped solid material that rotates 360 degrees around a living hinge axis centered on elements 154 and 152. This 360 degree rotary motion allows the apparatus 100 to be fully opened or closed manually by the operator or user. This movement is initiated by manually rotating the hinged component 130 from zero to 180 degrees about a living hinge on a center axis, positioned at the center axis of the external frame shaft 140. The inner component 150 or 150B is attached, secured, connected, and confined concentrically by two opposing shafts positioned along its diameter axis. These opposing shafts are embedded elements of the inside circumference surface of the hinged component 130. The inner component 150 or 150B is sized and shaped to be placed within a void recessed portion of the device 100, concentrically positioned with the center and circumference of both the external frame 120 and the hinged component 130. Two opposing holes 152 and 154 are placed along the outer circumference and diameter axis of the inner component 150 or 150B to fully enclose two opposing and exposed shafts of the hinge component 130 living hinge. These holes 152 and 154 are positioned along the centerline axis of the inner component 150 or 150B as shown in FIGS. 8, 11, 11A, 13 and 13A.

The external frame 120 of the second embodiment of the present invention 100, shown in FIGS. 8, 9, 9A, and 9B, is a rounded circular or polygon object that holds and serves as the support structure for the inner component 150 or 150B, the hinged component 130, and the external frame shaft 140. The external frame 120 has a set of semi-circular or polygon recesses that hold and secure all the individual apparatus 100 components in place. In addition, the external frame 120 has a first recessed opening 124 along its circumference or perimeter to accommodate the external frame shaft 140 and the hinge arm 134 of the hinged component 130. The external frame 120 has a second recessed opening 122 along its circumference or perimeter to accommodate the protruding material member 132 of the hinged component 130 equipped with either an opposing interference fit, spring loaded mechanism, or snap on locking arm mechanism. The external frame's 120 first recessed opening 124 and second recessed opening 122 are positioned directly opposite each other on an axis lying along the external frame's 120 diameter.

As shown in FIGS. 8, 12, 12A, 12B, and 12C, the second embodiment of the present invention 100 further comprises an external frame shaft 140 which is an object with three cylindrically shaped prongs. Two of the prongs are oppositely directed along a 180 degree axis and extend into, and are rotatably secured and fastened inside, the external frame 120 as one axis. The third prong extends at a right angle from the two-pronged 180 degree axis, to secure, and fasten the hinged component 130 in place by fixed insertion into the hinged arm 134 of the hinged component 130 and extends further towards one of the cavities, 152 or 154, of the inner component 150 or 150B.

In a third embodiment of the present invention 200, 230, and 230B, as shown in FIGS. 14–14D, 15–15B, 16–16C, 17–17B, 18, and 18A, the external frame 200 is a three-dimensional circular or polygon object that holds and serves as the support structure for the hinged component 230 or 230B and entire apparatus assembly. It has a semi-circular or polygon cavity that holds and secures the hinged component 230 or 230B into position. In addition, the external frame 200 has a ball joint cavity feature 224 along its circumference or perimeter to accommodate the ball joint hinge and shaft arm 232 of the hinged component 230 or 230B. This ball joint spherical cavity 224 is positioned and placed along the circumference or perimeter of the external frame 200 to hold and secure the hinged component 230 or 230B securely into position. The external frame 200 also has a pathway opening 222 that is equipped with either an interference fit mechanism, a spring loaded feature, or snap on locking mechanism. The pathway opening 222 is positioned along the diameter of the external frame 200 and is directly opposite the position of the ball joint spherical cavity 224.

The hinged component 230 or 230B of this third embodiment of the present invention, FIGS. 16–18A, is a three dimensional shaped solid material. The hinged component 230 or 230B is connected, attached, secured, welded, fastened or connected along the edge of its circumference or perimeter to a shaft arm and a ball joint hinge 232. The ball joint hinge 232 allows rotation from 0–90 degrees vertically and then 0–180 degrees laterally along the three-dimensional axis of the ball joint hinge 232. This ball joint hinge 232 rests and is secured in a spherical cavity 224, positioned on the external frame 200 planar surface. Directly opposite the hinge component shaft arm and ball joint hinge 232 and also along the circumference of the hinged component 230 or 230B, a protruding locking arm 234 extends outward and mates with the pathway opening 222 along the circumference or perimeter of the external frame 200. This protruding locking arm 234 feature of the hinged component 230 or 230B serves as a locking, snapping, spring-loaded, or fastening mechanism that operates congruently with the external frame pathway opening 222 and holds the entire device assembly securely together when the device is completely closed.

While the preferred material of construction for the present invention is poly-carbon, other suitable materials, depending on the end use of the embodiment, include metals such as aluminum or titanium, metal alloys, Kevlar®, high-impact graphite, crystals, wood, resins, fiberglass, and/or ceramics. Additionally, since it is critical for the present invention to achieve optimal balance in weight and/or mass about its central axis of gravity and rotation, the material of construction and physical dimensions must be amenable to precision machining, casting, molding and other manufacturing processes. These physical properties ensure that the centrifugal force acting on the apparatus when operated by a rotary reader or writer will not have a major adverse effect on its intended purpose and use. Also, these materials of construction aid in providing a unitary container/recording medium which is scratch/dust/dirt proof and impact resistant. The preferred materials also provide a unitary container/recording medium which is compact in design and does not contain unnecessary void and unusable spaces, thus leading to an efficient manufacturing and assembly process of the product against conventional disks with separate containers that exist in the market today. The resulting increased efficiency of the manufactured product and its possible applications include, without limitation, the storage of materials for use in analog, digital, or optical recordings of voice, data, sound, software applications, video, etc.

While the spirit and scope of three embodiments of the present invention have been described, the uses of the invention can be applied to record, protect, insulate, encapsulate, view and/or transfer photographs, prints, visual art, magnetic film, a two or three-dimensional mold, artwork, machining plate, printing fixture and or any useful and storable material within its own integrated and inter-related functioning components.

The foregoing description of preferred embodiments is not intended to impliedly limit the scope of protection of the following claims. Accordingly, for example, except where they are expressly so limited, the claims are not limited to applications involving self contained, digital or analog recording mediums. For example, the present invention provides a protective cover/container with the stored useful medium/device into a single unitary assembly wherein the user might protect, insulate, encapsulate and utilize other man-made or natural materials such as: (i) any electronic/electrical assembly, integrated circuitry and/or very large-scale integrated circuits or printed circuit boards; (ii) any medical or experimental specimens and/or samples; (iii) chemical and/or biological material in either liquid or solid form; (iv) any edible food or object in liquid or solid form; (v) any man-made solid object including, but not limited to, lenses, rings, coins, chips, other types of jewelry, etc.; (vi) any organic or non-organic object; and (vii) another mechanical or electronic device including, but not limited to, a watch, a personal digital assistant, a cell phone, a computer, an electronic handheld device, a directional compass, a camera, a video monitor screen, an electronic book, a toy, etc. Although the invention has been described in some detail with reference to the preferred embodiments, those of skill in the art will realize, in light of the teachings herein, that certain changes and modifications can be made without departing from the spirit and scope of the invention. Accordingly, the invention is limited only by the claims.

I claim:

1. A self-contained, multi-axis recordable and storage apparatus, comprising:

a three-dimensional hinged component of defined polygon or circular dimension and predetermined height having an attachment means, a hinge means, an inner surface, an outer surface, and wherein each surface further comprises a polygon or concentric circular opening on the central axis of the surface;

a three-dimensional external frame component of defined polygon or circular dimension and predetermined height consistent with the hinged component, with internal diameter opening sized to engage and house the hinged component, and having attachment means corresponding to the attachment means of the hinged component, hinge means, internal diameter wall, internal diameter edge surface, top side, bottom side, and recess located within the internal diameter wall;

an external frame solid cylindrical shaft component of predetermined length insertably connected into the hinge means of the hinged component and the external frame wherein the hinged component can rotate 360 degrees about the shaft from a closed position on the top side of the external frame to a fully opened position on the bottom side of the external frame;

a three-dimensional internal component of defined polygon or circular dimension and predetermined height consistent with the external frame, concentrically housed within the recess of the external frame such that the internal component may move vertically within the recess, and having an inner surface and an outer surface, wherein each surface further comprises polygon or concentric circular openings on the central axis of the surfaces in alignment with the polygon or concentric circular openings on the central axis of the hinged component and external frame surfaces and two recessed edges aligned with the attachment means and hinge means of the hinged component, and wherein the inner surface supports the external frame when the apparatus is closed and the outer surface supports the external frame when the apparatus is fully open; and wherein the weight and mass of the assembled apparatus are centrifugally balanced about the central axis of the apparatus when the hinged component is either fully closed or rotated 360 degrees to be fully opened.

2. The apparatus according to claim 1, wherein the hinged component hinge means further comprises a hinge arm attached to the edge of the hinged component and which comprises an opening through the hinge arm which is sized to receive and house the external frame shaft.

3. The apparatus according to claim 2, wherein the external frame hinge means further comprises an opening sized to receive and house the hinge arm attached to the edge of the hinged component and which further comprises an opening through the body of the external frame aligned to match the opening through the hinge arm and which is sized to receive and house the external frame shaft to provide a living hinge.

4. The apparatus according to claim 3, wherein the hinged component attachment means further comprises a mechanically activated locking mechanism attached to the edge of the hinged component and which is sized to engage and hold the external frame attachment means.

5. The apparatus according to claim 4, wherein the external frame attachment means further comprises a mechanically activated locking mechanism attached to the internal diameter edge surface of the external frame and which is sized to engage and hold the hinged component attachment means.

6. The apparatus according to claim 5, wherein the internal component surfaces further comprise magnetic, optical, print, etched, photographic or visual art medium, and useful storable materials, either legible, visible, or encoded in digital or analog formats.

7. The apparatus according to claim 5, wherein the hinged component surfaces further comprises magnetic, optical, print etched, photographic or visual art medium, and useful storable materials, either legible, visible, or encoded in digital or analog formats.

8. The apparatus according to claim 5, wherein the hinged component inner surface is recessed to define a polygon or circle of predetermined dimension and further comprises means to receive and temporarily secure existing recorded medium and equally sized notches opposed from each other across the inner or outer diameter through the central axis of the hinged component.

9. The apparatus according to claim 8, wherein means to receive and temporarily secure existing recorded medium further comprises at least one of a snap-on mechanism or adhesive positioned concentrically along the recessed inner or outer circumference or boundary of the polygon or circle and sized to accept and temporarily secure existing recorded medium.

10. The apparatus according to claim 8, wherein means to receive and temporarily secure existing recorded medium further comprises at least one of a slotted hole locking mechanism or adhesive centered on the central axis of polygon or circle, wherein the locking mechanism is sized to accept and temporarily secure existing recorded medium.

11. The apparatus according to claim 10, wherein the hinged component further comprises means to seal with the inner component.

12. The apparatus according to claim 10, wherein the components are constructed from materials comprising poly-carbon, metals such as aluminum or titanium, metal alloys, Kevlar®, high-impact graphite, crystals, wood, resins, fiberglass, and ceramics.

13. A self-contained, multi-axis recordable and storage apparatus, comprising:
  a three-dimensional hinged component of defined polygon or circular frame dimension, uniform width, and predetermined height having an attachment means, a hinge means, and defining an inner opening of polygon or circular dimension consistent with the frame, an outer frame surface, an inner frame surface, and means to receive and hold an inner component such that the inner component is free to rotate 360 degrees about a central axis of the frame;
  a three-dimensional external frame component of defined polygon or circular dimension and predetermined height consistent with the hinged component, with internal diameter opening sized to engage and house the hinged component, and having attachment means corresponding to the attachment means of the hinged component, hinge means, internal diameter wall, top side, and bottom side, and wherein the top side further comprises two sets of semi-circular recesses which define an outer and inner set of raised semi-circular rings about a common central axis of the external frame, wherein the top side and bottom side further comprise a concentric circular opening of predetermined diameter on the common central axis which has a raised circular ring on the top side;
  an external frame shaft comprising three connected circular prongs of equal length, wherein two prongs are oppositely directed along a common longitudinal axis insertably connected into the hinge means of the external frame and the third prong extends perpendicularly from the center point of the longitudinal axis and is insertably connected into the hinged component allowing the hinged component to rotate 180 degrees about the shaft from a closed position on the top side of the external frame to an open position;
  a three-dimensional inner component of defined polygon or circular dimension and predetermined height consistent with the external frame, concentrically housed within the inner opening of the hinged component such that the internal component may rotate 360 degrees within the inner opening, and having an internal surface and an external surface, wherein each surface further comprises concentric circular openings on the central axis of the surfaces of equal size to, and in alignment with, the concentric circular opening on the central axis of the external frame; and which is supported by the external frame inner set of raised semi-circular rings and circular ring when the hinged component is closed; and
  wherein the assembled apparatus weight and mass are centrifugally balanced about the central axis of the external frame component when the hinged component is closed.

14. The apparatus according to claim 13, wherein the hinged component hinge means further comprises a hinge arm attached to the outer frame surface of the hinged component directly across from the hinge component attachment means, and which is sized to fit into the external frame hinge means, and which further comprises a shaft through the hinge arm which is sized to receive and house the perpendicular prong of the external frame shaft.

15. The apparatus according to claim 14, wherein the external frame hinge means further comprises an opening in the outer concentric circle sized to receive and house the hinge arm attached to the edge of the hinged component, and which further comprises a shaft through the body of the external frame which is sized to receive and house the horizontally opposed prongs of external frame shaft.

16. The apparatus according to claim 15, wherein the hinged component attachment means further comprises a protruding material member attached to the outer frame of the hinged component at a position directly across from the hinge arm and which is sized to fit into and engage the external frame attachment means.

17. The apparatus according to claim 16, wherein the external frame attachment means further comprises a recessed portion between the outer raised semi-circular rings housing a mechanically activated fastening means attached to the edge of the external frame and which is sized to receive and hold the hinged component protruding member.

18. The apparatus according to claim 17, wherein the means to receive and hold the inner component further comprises two opposing shafts of predetermined length, each securely housed within opposing openings located on the hinged component inner frame surface, and wherein the openings are sized such that half of each shaft is exposed along the central axis of the hinged component.

19. The apparatus according to claim 18, wherein the inner component further comprises two opposing holes along the centerline axis of the inner component, wherein each hole is positioned and sized to receive an exposed shaft of the means to receive and hold the inner component and provide dual living hinges which afford 360 degree rotation about the central axis of the hinged component and within the hinged component defined inner opening.

20. The apparatus according to claim 19, wherein the inner component outer surface and inner surface further comprise magnetic, optical, print, etched, photographic or visual art medium, and-useful storable materials, either legible, visible, or encoded in digital or analog formats.

21. The apparatus according to claim 19, wherein the external frame top side and bottom side further comprise print, etched, photographic or visual art medium.

22. The apparatus according to claim 20, wherein the inner component further comprises an inner surface and an outer surface, wherein the inner surface is recessed to define two raised semi-circles of predetermined height and width dimensions and which further comprises means to receive and temporarily secure existing recorded medium and equally sized notches opposed from each other across the inner or outer diameter through the central axis of the inner component, and wherein the inner surface and outer surface further comprise a concentric circular opening of predetermined diameter on the inner component central axis.

23. The apparatus according to claim 22, wherein the inner component further comprises means to seal with-the external frame component.

24. The apparatus according to claim 22, wherein the components are constructed from materials comprising poly-carbon, metals such as aluminum or titanium, metal alloys, Kevlar®, high-impact graphite, crystals, wood, resins, fiberglass, and ceramics.

25. A self-contained, multi-axis recordable and storage apparatus, comprising:
a three-dimensional hinged component of defined polygon or circular frame dimension, uniform width, and predetermined height, and defining a recessed inner face opening of polygon or circular dimension consistent with the frame, an outer face, an outer frame surface, an inner frame surface, an attachment means, and a hinge means which allows the inner face to rotate about a central axis of the frame, and wherein the inner face surface and outer face surface further comprise a concentric circular opening of predetermined diameter on the hinged component central axis;
a three-dimensional external frame component of defined polygon or circular dimension and predetermined height consistent with the hinged component, with internal diameter opening sized to engage and house the hinged component, and having attachment means corresponding to the attachment means of the hinged component, hinge means, internal diameter wall, top side, and bottom side, and wherein the top side further comprises an outer raised planar surface of predetermined width about a common central axis of the external frame, and wherein the top side and bottom side further comprise a concentric circular opening of predetermined diameter on the common central axis which has a raised circular ring on the top side; and
wherein the assembled apparatus weight and mass are centrifugally balanced about the central axis of the external frame component when the hinged component is closed.

26. The apparatus according to claim 25, wherein the hinged component hinge means further comprises a ball joint shaft and hinge attached to the outer frame surface of the hinged component directly across from the hinge component attachment means, and which is sized to fit into the external frame hinge means, and which provides vertical movement up to 90 degrees vertically and 180 degrees laterally along the three-dimensional axis of the ball joint hinge.

27. The apparatus according to claim 26, wherein the external frame hinge means further comprises a spherical cavity positioned on the external frame planar surface sized to receive and house the external frame ball joint shaft and hinge.

28. The apparatus according to claim 27, wherein the hinged component attachment means further comprises a protruding hinge arm attached to the outer frame of the hinged component at a position directly across from the ball joint shaft and hinge and which is sized to fit into and engage the external frame attachment means.

29. The apparatus according to claim 28, wherein the external frame attachment means further comprises a recessed portion between the raised planar surface housing a mechanically activated fastening means attached to the edge of the external frame and which is sized to receive and hold the hinged component protruding hinge arm.

30. The apparatus according to claim 29, wherein the hinged component outer surface and inner surface further comprise magnetic, optical, print, etched, photographic or visual art medium, and other useful storable materials, either legible, visible, or encoded in digital or analog formats.

31. The apparatus according to claim 29, wherein the external frame component top side and bottom side further comprise print, etched, photographic or visual art medium.

32. The apparatus according to claim 31, wherein the hinged component further comprises means to receive and temporarily secure existing recorded medium and equally sized notches opposed from each other across the inner or outer diameter through the central axis of the hinged component.

33. The apparatus according to claim 32, wherein the means to receive and temporarily secure existing recorded medium further comprises at least one of a snap-on mechanism or adhesive positioned concentrically along the recessed circumference or boundary of the polygon or circle and sized to accept and temporarily secure existing recorded medium.

34. The apparatus according to claim 29, wherein the components are constructed from materials comprising poly-carbon, metals such as aluminum or titanium, metal alloys, Kevlar®, high-impact graphite, crystals, wood, resins, fiberglass, and ceramics.

* * * * *